UNITED STATES PATENT OFFICE.

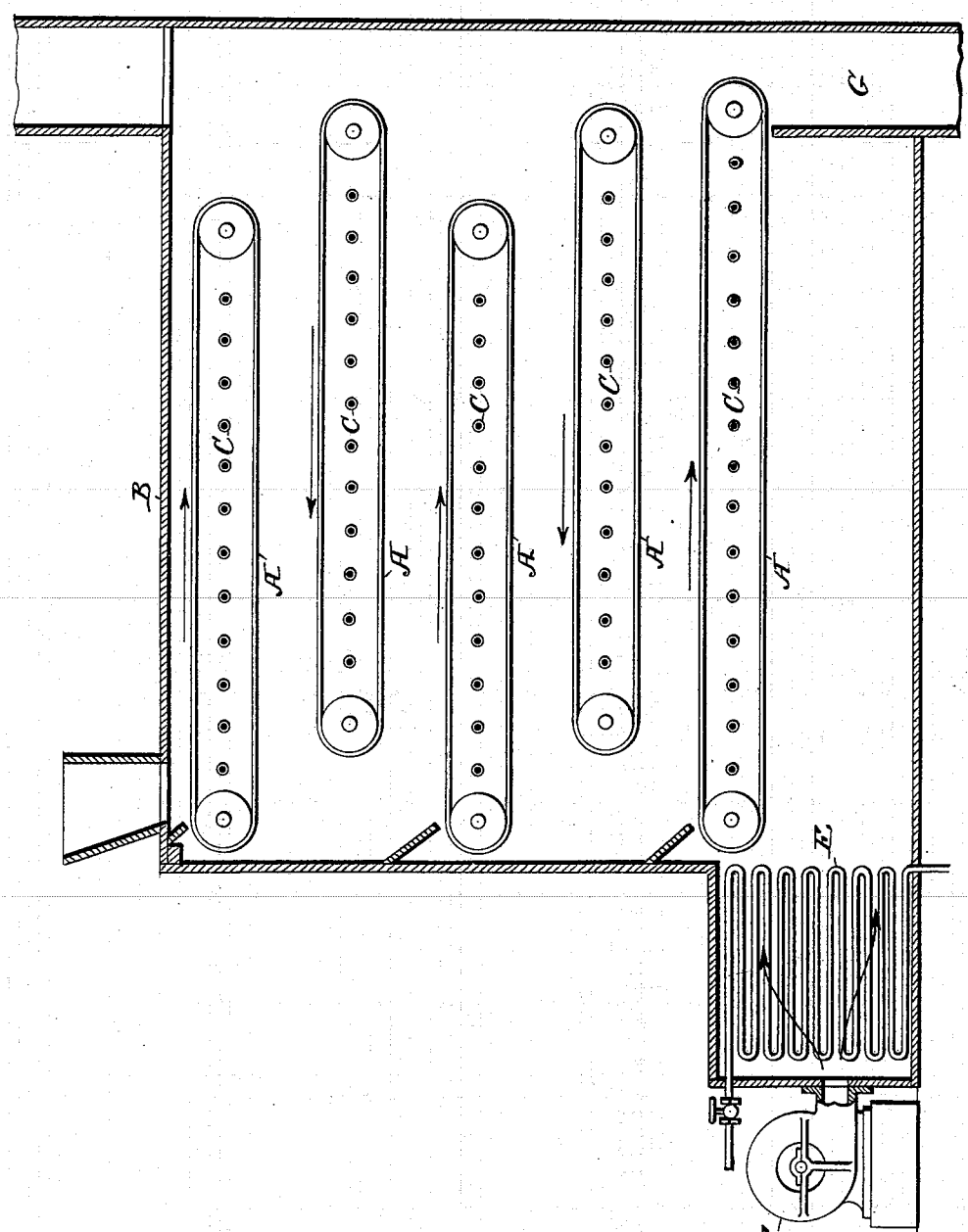

HARVEY W. WILEY, OF WASHINGTON, DISTRICT OF COLUMBIA, ASSIGNOR OF ONE-HALF TO THE MARSDEN COMPANY, OF PHILADELPHIA, PENNSYLVANIA.

MANUFACTURE OF ALCOHOL.

SPECIFICATION forming part of Letters Patent No. 615,376, dated December 6, 1898.

Application filed February 21, 1898. Serial No. 671,196. (No specimens.)

*To all whom it may concern:*

Be it known that I, HARVEY W. WILEY, a citizen of the United States, residing in the city of Washington, District of Columbia, have invented certain new and useful Improvements in the Manufacture of Alcohol, of which the following is a specification.

It is well known that the stalks of Indian corn, sorghum, and some other cereals contain at the time of the ripening of the seed large quantities of sugar. When the stalks are left standing after the maturity of the grain, the sugar entirely disappears by a natural process of fermentation. The same condition obtains when the stalks are cut and brought together in shocks. The common means of preserving the sugars, which are the most valuable part of the stalks, has been by cutting them into small bits and storing them in silos. Even this method results in a great loss by fermentation. The residue is sour and the acid tends to cause decay in the teeth of animals eating it and renders the mass more or less unpalatable—so much so that cattle do not eat it with avidity. My invention, which I will now describe, relates to the method of treating such stalks and the use of the treated material in making alcohol.

The essential principle of my invention consists in cutting the stalks before the saccharine matters have begun to ferment, sterilizing the cut or crushed stalk, drying the same only sufficiently to prevent the juices from flowing out subsequently under pressure, pressing the sterilized material into bales, and preferably subjecting the exterior of these bales to a second sterilization. By this treatment the sugar content of the material (both the glucose and the sucrose) is preserved intact and the taste is not impaired.

In the application of my process to Indian-corn stalks, for instance, the period of harvest is preferably selected when the sugar content is most abundant—viz., at the time of harvesting the ears for the green-corn market or at a slightly-later period, when the starch in the grains is hard. If the ears are harvested at this time and cured in small piles, the weight is greater and the grains fuller than when allowed to become fully dry on the stalk. My process does not therefore interfere with the saving of the crop of grain for any purpose whatever. It is not necessary to detach the ears, but they may be incorporated with the other preserved particles, and will thus retain their maximum value as a source of alcohol. Nor is it advisable to remove the blades of the stalks or even the husks of the ears before submitting the harvested materials to the next process. The stalks are next subjected, in any suitable apparatus, to a shredding process, by which they are reduced to as fine a state of subdivision as desirable. Preferably the comminution is carried on until the particles are extremely fine. This product I term the "pulp." The pulp thus prepared is delivered to a sterilizing apparatus so constructed—for instance, as shown in the accompanying drawing—as to keep the whole mass for a sufficient length of time at or near a temperature of 212° Fahrenheit. I prefer for this purpose to carry the pulp on a series of endless aprons A, of metal or other suitable material, in a closed chamber B, heated by steam-pipes C or otherwise. In passing through this chamber a portion of the moisture is volatilized and may be conducted away by a current of air. Since the air carries germs which might escape destruction in rapidly passing through the drier, I prefer to use air heated to a temperature of boiling water, or about that temperature, for this purpose. This sterilized air is heated by passing over a series of steam-coils E or by any other convenient method, and is forced into the sterilizing-oven by a blower F or other convenient means. The pulp should remain in the sterilizer long enough to secure the destruction of such germs as would promote decomposition, and this is accomplished as soon as every part has approximated the temperature of boiling water. The form of the sterilizing-oven, the temperature of the steam-coils, and the rate of motion of the endless apron will determine this point. For the sake of economy of heat this part of the process should not be continued longer than is necessary to secure complete sterilization and the evaporation of so much moisture that none will be expelled by subsequent pressure. The sterilized pulp is next delivered through a chute G to a compressor preferably contained in a chamber at the temperature of boiling water or provided with an interior steam-service which maintains those parts of it coming in contact with the hot pulp approximately at the temperature of boiling water and is thereby compressed or consolidated into blocks, bales, or layers of suitable form and size. Another step, which is often advantageous, consists in subjecting the surface of each bale or block to a final sterilization and superficial drying. This is accomplished by placing them for a few moments in a chamber heated to a temperature of sterilization—say 180° to 212°. The surface is thus dried and resterilized. I have found that the sterilized and dried fiber of Indian-cornstalks, sorghum, &c., or the cloth or cotton covering applied to potatoes or other non-fibrous materials, has the same properties as are possessed by cotton of being able to stop the passage of germs through them. The bales of sterilized pulp prepared as above are thus surrounded with a dried sterilized layer of cellulose and cellulose-like material, which interposes a complete barrier to the entrance of fermentative germs to the more moist sterilized material of the interior. The pulp therefore keeps perfectly fresh for an indefinite time and is ready for use whenever the integuments are loosened or removed. The material thus prepared may be retained for an indefinite length of time and transported to any desired place for use in the manufacture of alcohol. For this purpose it is only necessary to break up the bales or layers of pulp, extract the soluble portions with water, add yeast, and ferment and distil, as usual. I do not, however, limit myself to any special series of steps in the treatment of the prepared pulp.

I claim as my invention—

In the manufacture of alcohol, cutting vegetable stalks before fermentation of the juices thereof, comminuting and subjecting to heat to sterilize the same and evaporate a portion only of the water, then compressing into a more or less solid mass, and thereafter diffusing the soluble portions of the mass in water and fermenting and distilling, substantially as described.

In testimony whereof I have signed my name to this specification in the presence of two subscribing witnesses.

HARVEY W. WILEY.

Witnesses:
G. L. SPENCER,
M. S. TIDD.